March 24, 1970 D. R. JOHNSON 3,502,152
LONG-SHANK VIBRATING PLOW
Filed Sept. 12, 1967 2 Sheets-Sheet 1

INVENTOR:
DONALD R. JOHNSON
BY:

INVENTOR:
DONALD R. JOHNSON

United States Patent Office 3,502,152
Patented Mar. 24, 1970

3,502,152
LONG-SHANK VIBRATING PLOW
Donald R. Johnson, Lubbock, Tex., assignor to Lubbock Manufacturing Company, Lubbock, Tex., a corporation of Texas
Filed Sept. 12, 1967, Ser. No. 667,246
Int. Cl. A01b 11/00, 59/06, 63/102
U.S. Cl. 172—40                                    16 Claims

ABSTRACT OF THE DISCLOSURE

A heavy duty plow with extra long shanks is used for loosening the subsoil for road construction and is attached to the tractor by two four-member pivoted linkages. The plow itself is vibrated in a horizontal direction and the linkages primarily have ball joints to reduce transmission of the vibration from the plow to the tractor. The two four-member pivoted linkages provide for clearance or removal of the plow from the ground as well as isolation of the vibration from the plow to the tractor.

BACKGROUND OF THE INVENTION

Field of the invention

This invention relates to heavy-duty vibratory plows as used for mining, industrial, agricultural, or construction purposes.

Description of the prior art

Kelley, in U.S. Patent #3,170,300, discloses a long-shanked plow attached to the rear of a crawler-type tractor, with a cable-laying attachment connected thereto. Kelley uses a single member linkage for vertical raising and lowering. As the plow is raised, its angle changes.

Bodine, U.S. Patent #3,033,543, provides a mining tool which vibrates with respect to the tool-bar. Bodine causes his tool to enter or leave the ground by pivoting the tool about the pivot 21, which changes the angle of the tool as it plows deeper.

Rogers, U.S. Patent #3,183,979, raises and lowers the frame of a towed tool-bar by pivoting the ground-engaging wheels 40. The entire tool-bar frame or tool-bar assembly is vibrated, primarily in a horizontal direction.

Truelock et al., U.S. Patent #3,286,534, discloses a plow frame, the entire tool-bar assembly of which is vibrated in a horizontal direction. Details of the connection of the tool-bar assembly to the tractor as well as details of raising and lowering the tool-bar are obscure in the patent. However, physical embodiments of the machine reveal the tool-bar assembly is towed behind the tractor rather than being attached to it, and that the raising and lowering of the plow shanks 14 is by raising and lowering the ground-engaging wheels.

SUMMARY OF THE INVENTION

I have provided a hitch to attach deep-plowing, long-shank plows directly to the tractor so that the plow is carried by the tractor and vibrated. I have provided two four-member linkage assemblies for this purpose. This accomplishes the main goals. The isolation of the vibration upon the tool-bar from the tractor and also provides linkage by which the long, deep plow shank may be lifted clear of the ground for transportation. Furthermore, the depth of the plow does not seriously change the angle. Also, the motor in the form of an internal combustion engine to drive the vibratory means which vibrates the tool-bar, primarily in a horizontal direction, is mounted to the framework by which tool-bar mechanism is attached to the rear of the tractor. Because of the considerable distance the tool-bar assembly must move to lift the shank clear of the ground, the platform upon which the engine is mounted itself is pivoted so that the shaft connecting the engine to the vibrator is not strained.

Also, with the linkage according to my invention, it is possible to exert down-pressure on the plows to force the plows into the ground from the hitch. It is possible to do this without transmitting vibration into the tractor or inhibiting the vibration of the plow.

Furthermore, although the plow is mounted in such manner that it is free to move horizontally. It will be understood that the vibration upon the tool-bar does not result in a "pure" horizontal rectilinear movement at the plow point. In fact the movement of the plow point will be somewhat complex because there will be a horizontal movement aligned with the direction of draft and, furthermore, there will be a resultant vertical movement particularly upon the end plows. The vertical movement and movement aligned with direction of draft is more pronounced on the end plows than on the plows in the center of the tool-bar.

An object of this invention is to connect a deep-plowing-vibratory plow to a tractor.

Further objects are to achieve the above with a device that is sturdy, compact, durable, simple, safe, versatile, and reliable, yet inexpensive and easy to manufacture, install, operate, and maintain.

Still further objects are to achieve the above with a method that is safe, rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
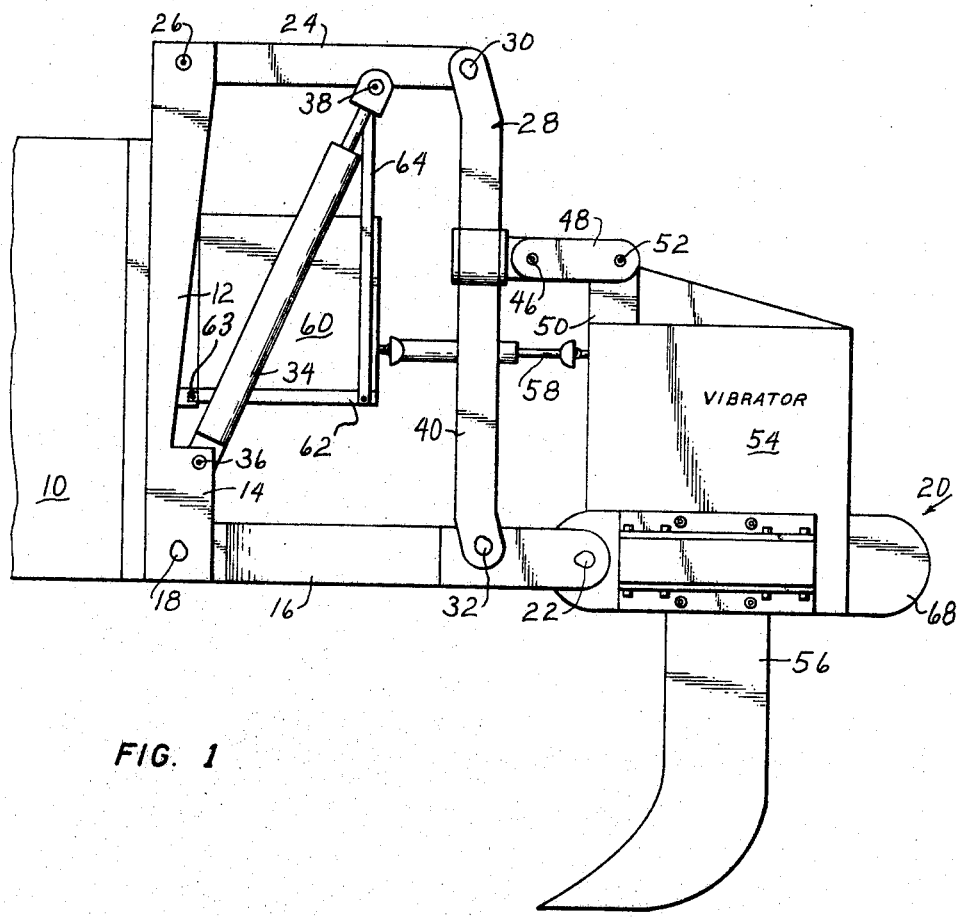
FIG. 1 is a side elevational view of a vibratory plow attached to a tractor, the tractor broken away; the tractor, the internal combustion engine, and the vibrator are shown schematically.
Figure 2:
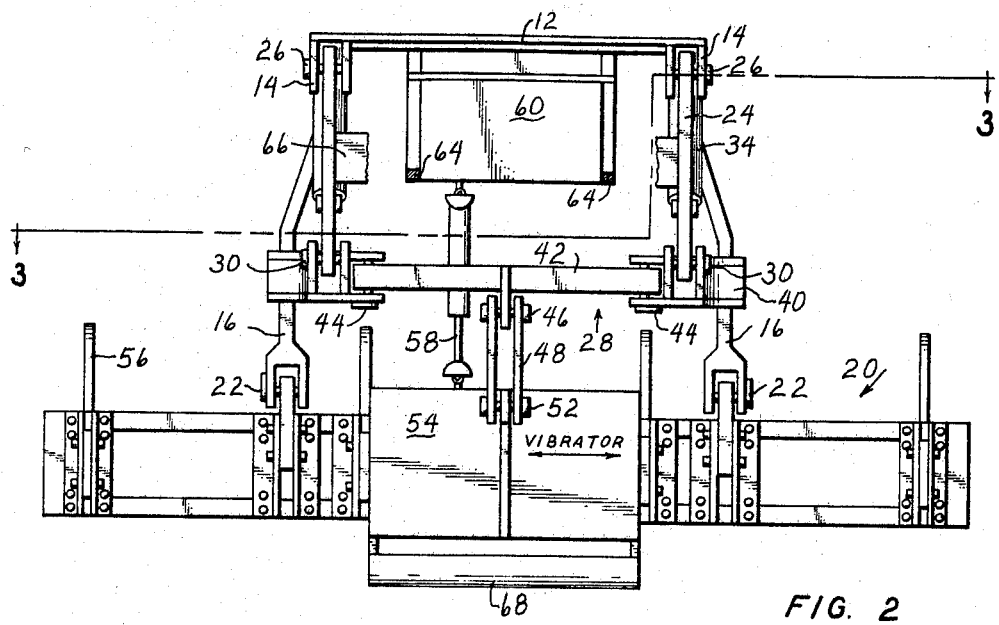
FIG. 2 is a top-plan view of the hitch assembly and tool-bar assembly, the tractor not shown, and parts are broken away for clarity.
Figure 3:
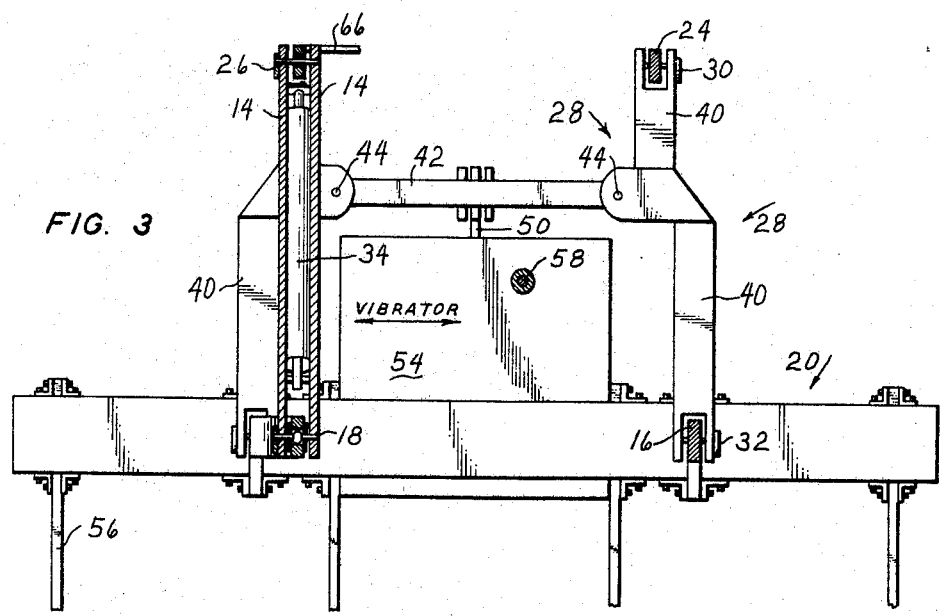
FIG. 3 is a sectional view through the hitch looking rearwardly, taken substantially on line 3—3 of FIG. 2.

The invention is shown attached to a "crawler" or "track laying" type tractor 10. Inasmuch as the tractor itself forms no part of the invention, the tractor is shown schematically and only partially.

Pivot base 12, in the form of a plate with ears 14 attached thereto, is securely attached by bolting to the rear of the tractor 10. The pivot base could be an integral part of the tractor.

Two lower arms 16 are pivoted about pivot points 18 to the ears 14 on the lower part of the pivot base 12. These two lower arms 16 extend rearwardly in the direction of draft and tool-bar assembly 20 is pivoted thereto at pivot points 22. Canopy or lifting arms 24 are pivoted to the ears 14 on the upper portion of the pivot base 12 by pins 26. The canopy or lifting arms 24 are horizontally oriented as are the lower arms and extend rearwardly from the pivot base 12. Yoke 28 is attached by pivot points 30 to the rear extreme of the canopy or lifting arm 24. The lower part of the yoke 28 is attached by pivot points 32 to the lower arms 16 intermediate of the pivot points 18 and 22. Hydraulic cylinders or expandable motors 34 are pinned at their lower end with pins 36 to the ears 14 slightly above pivot points 18. The upper end of each expandable motor 34 is pinned by pin 38 to one of the canopy or lifting arms 24 intermediate the pins 26 and pivot point 30.

The yoke 28 is a composite part including two vertically oriented pitmans 40. Intermediate the pivot points 30 and 32, cross-bar 42 is pivoted to the pitmans by pivot points 44. Pivot point 46 midway cross-bar 42 connects horizontally oriented upper arm 48 to the top of vertical member 50 which is a portion of the tool-bar assembly 20. The connection between upper arm 48 and the vertical member 50 is by pivot point 52.

Analysis of the parts described above and more particularly referring to FIG. 1 will show that what has been described is two four-member pivoted linkages. The main linkage includes vertically oriented links which are the pivot base 12 and the yoke 28. Two horizontally oriented links include the lower arm 16 and the lifting arms 24. The second four-member pivoted linkage includes as the two vertically oriented links a portion of the yoke 28 and the vertical member 50 of the tool-bar assembly 20. The horizontal oriented links of this second linkage includes the upper arm 48 and an extension of the arm 16, i.e., a portion of the arm 16 which is an extension of one of the horizontally oriented links of the main linkage. Also, plow shank 56 remains substantially vertical as the tool-bar assembly is raised and lowered.

The hydraulic motor 34 is connected between two of the links of the main linkage. The hydraulic motor 34 forms means for raising and lowering the tool-bar assembly 20 or expressed otherwise, means for raising and lowering the yoke 28.

The pins 26, 36, and 38, permit rotation about their axis only. However, the pivot points 18, 22, 30, 32, 44, 46 and 52 are ball and socket type pivots which permit universal pivoting, i.e., they permit the two elements or links joined together with a pivot to move or pivot in any direction or in multiple planes about the center of the joint. Inasmuch as ball-socket joints, which freely allow two members to pivot in such manner, are well known mechanical elements commercially on the market, they will not be described further here.

Analysis will show that the tool-bar assembly 20 is free to move in a horizontal direction transverse to the direction of draft. The direction of draft will be generally in a horizontal direction aligned with the lower arms 16. Stated otherwise, the lower arms 16 are generally oriented in the direction of the draft. The tool-bar assembly 20 is controlled (has free movement) in the direction of the draft. Also, the tool-bar assembly is controlled (has no free movement) in a general vertical orientation; i.e., a line connecting pivot points 22 and 52 also called direction of depth. However, the tool-bar assembly is uncontrolled or free to move horizontally transverse to the direction of the draft (also called direction of vibration) because of its connection by the pivot points described. This freedom of movement is restricted to a few inches, however, it is sufficient for the tool-bar to move freely two or three inches to either side of dead center and, therefore, free to be vibrated responsive to vibrator 54.

It will be noted that lower arms 16 are at least twice the length of upper arm 48. Stated otherwise, the horizontal links of the main linkage are at least twice as long as the horizontal links of the second linkage.

The vibrator 54 is a mechanism which produces substantially unidirectional vibration. It is readily achieved by either moving a weight rectilinearly in the direction vibration is desired, e.g., as shown in Rogers, U.S. Patent #3,183,979, FIG. 7, or Truelock et al., U.S. Patent #3,286,534. The preferred means for achieving this unidirectional vibration is by a pair of eccentrically rotating weights as is well known to the art. The vibrator is securely attached to the tool-bar assembly. Also, earth-working tools in the form of depending ripper plows 56 are rigidly and securely attached to the vibrator assembly.

It is noted that the length of the shank of the plow 56 is long.

The power supplying the vibrator 54 is transmitted through shaft 58. The shaft 58 may be rotated from the power takeoff of the tractor or from a hydraulic motor attached to the vibrator, however, I prefer an internal combustion engine 60 mounted on platform 62, which is hinged about a horizontal hinge 63 to pivot base 12. The rear of the platform 62 is attached by suspension arms 64 to canopy 66. The platform 62 is pivoted so that the universal joints of the shaft 58 are not extended beyond their normal operating range upon raising and lowering the tool-bar assembly 20.

The canopy or lifting arms 24 are connected together by the stiffening plate or canopy 66 inasmuch as it is not necessary they move sideways.

Bumper 68 at the rear of the tool-bar assembly provides an area for pushing the plow by a bulldozer if necessary.

I claim as my invention:

1. In an earth-working apparatus having a tractor, a tool-bar assembly, at least one earth-working tool attached to said tool-bar assembly, and vibratory means on said tool-bar assembly for vibrating the same; the improved hitch for attaching the tool bar assembly to the tractor comprising in combination: a pivot base on the rear of the tractor, at least one lower arm pivoted to the base and extending rearwardly at which point it is pivoted to the tool-bar assembly, a yoke assembly pivoted at one end at a point between the above recited pivots to said lower arm, two lifting arms each having one end hinged to the base and the other end pivoted to said yoke assembly, said lower arm, yoke assembly, and lifting arms providing a lifting linkage, and at least one hydraulic motor interconnecting said base and said lifting linkage for lifting the arms and thus said yoke assembly, and at least one upper arm pivoted at one end to said yoke assembly, between its upper and lower ends, and pivoted at the other end to the tool-bar assembly.

2. The invention as defined in claim 1 with the additional limitation of
   (k) said lower arm being over twice the length of said upper arm.

3. The invention as defined in claim 1 with the additional limitation of
   (k) a motor mounted on said base and
   (m) drive means interconnecting said motor and vibratory means for driving said vibratory means.

4. The invention as defined in claim 1 with the additional limitation of
   (k) all said pivots are such that they permit movement in multiple planes.

5. The invention as defined in claim 1 with the additional limitation of
   (k) said vibratory means producing horizontal vibration.

6. The invention as defined in claim 1 with the additional limitation of said pivot base being
   (k) a vertical plate bolted to the rear of the tractor.

7. The invention as defined in claim 1 with the additional limitation of
   (o) said upper arm pivoted to said yoke assembly between said lifting arms and lower arm.

8. The invention as defined in claim 1 with the additional limitation of said yoke including
   (o) a pair of pitmans
   (p) each pitman connecting a lifting arm to a lower arm and
   (q) a cross bar
   (r) pivoted at each end to one of said pitmans,
   (s) said upper arm pivoted to said cross bar.

9. In an earth-working apparatus having
   (a) a tractor,
   (b) a tool-bar assembly, and
   (c) at least one earth-working tool attached to said tool-bar assembly;

(d) the improved hitch for attaching the tool-bar assembly to the tractor comprising in combination:
(e) a main four-member pivoted linkage including:
    (i) two vertical oriented links,
    (ii) one of which is a pivot base rigidly attached to the tractor, and
    (iii) the other of which is designated a yoke, and
    (iv) two horizontally oriented links, and
(f) additional mechanism comprising:
    (i) two vertically oriented links,
    (ii) one of which is a portion of the yoke, and
    (iii) the other of which is rigidly attached to the tool-bar assembly, and
    (iv) two horizontally oriented links,
    (v) one of which is an extension of one of said horizontally oriented links of said main linkage, said extension having its end pivotally connected to a lower portion of the tool bar assembly, and the other of said horizontally oriented links having one end pivoted to said yoke assembly, between its ends, and the other end pivotally connected to the upper end of the vertical tool bar assembly link, and
(g) power means for raising and lowering said tool-bar assembly,
(h) said power means interconnecting two links of said main linkage, one of which is the pivot base.

10. The invention as defined in claim 9 with the additional limitation of
(j) said power means being a hydraulic motor
(k) interconnecting the pivot base and one of the horizontally oriented links of the main linkage.

11. The invention as defined in claim 9 with the additional limitation of
(j) vibratory means on said tool-bar assembly for vibrating same; and
(k) all pivot joints of all links forming a part of said second linkage are pivotable in multiple directions.

12. The invention as defined in claim 9 with the additional limitation of
(j) each of said horizontal links of the main linkage being at least as long as each of said horizontal links of the second linkage.

13. The invention as defined in claim 12 with the additional limitation of
(k) vibratory means on said tool-bar assembly for vibrating same; and
(m) all pivot joints of all links forming a part of said second linkage are pivotable in multiple directions.

14. The invention as defined in claim 3 with the additional limitation of
(n) said motor mounted on said base by being mounted to (o) a motor platform which is
(p) hinged to said base, and
(q) suspension arms extending to said lift means so that when the yoke assembly is raised or lowered the motor platform pivots.

15. The invention as defined in claim 11 with the additional limitation of
(m) a platform pivoted to said pivot base,
(n) said platform connected to another member of said main four-member linkage, so that as the tool-bar assembly is raised and lowered the platform pivots, and
(o) a motor mounted on the platform with
(p) a shaft connecting the motor to said vibratory means.

16. In an earth-working apparatus having
(a) a tool-holding assembly,
(b) at least one earth-working tool attached to said tool-holding assembly and
(c) vibratory means on said tool-holding assembly for vibrating said earth-working tool,
(d) the improvement comprising in combination with the above:
    (e) a base member,
    (f) hitch means interconnecting the base member and the tool-holding assembly for raising and lowering said tool-holding assembly,
    (h) a platform
    (j) pivotally attached to said base member about a horizontal axis and having support means pivotally connecting said platform to said hitch means,
    (k) a motor mounted on said platform, a shaft connecting said motor to said vibratory means, and
    (m) means for pivoting said platform on said base member responsive to raising and lowering the tool-holding assembly.

References Cited
UNITED STATES PATENTS

| | | | |
|---|---|---|---|
| 2,725,799 | 12/1955 | Day et al. | 37—108 |
| 2,822,628 | 2/1958 | Arps et al. | 172—739 |
| 3,060,696 | 10/1962 | Lang | 172—484 |
| 3,336,985 | 8/1967 | Rogers | 172—40 |
| 3,363,423 | 1/1968 | Davis | 172—40 X |

ROBERT E. BAGWILL, Primary Examiner

STEPHEN C. PELLEGRINO, Assistant Examiner

U.S. Cl. X.R.

61—72.6; 172—439, 484